(12) United States Patent
Honda (10) Patent No.: US 8,379,252 B2
(45) Date of Patent: Feb. 19, 2013

(54) INFORMATION PROCESSING APPARATUS, INFORMATION PROCESSING METHOD, AND STORAGE MEDIUM FOR STORING PROGRAM

(75) Inventor: Kinya Honda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 635 days.

(21) Appl. No.: 12/420,575

(22) Filed: Apr. 8, 2009

(65) Prior Publication Data

US 2009/0257087 A1 Oct. 15, 2009

(30) Foreign Application Priority Data

Apr. 11, 2008 (JP) ................................. 2008-103839

(51) Int. Cl.
*G06F 3/12* (2006.01)
*G06K 15/00* (2006.01)
*B42C 9/00* (2006.01)
*B42C 7/00* (2006.01)
*B42C 11/00* (2006.01)
*B42B 15/00* (2006.01)

(52) U.S. Cl. ...................... 358/1.15; 358/1.13; 358/1.14; 358/1.16; 358/1.18; 415/2; 415/3; 415/4; 415/5; 415/6; 415/7; 415/8

(58) Field of Classification Search ........................ None
See application file for complete search history.

(56) References Cited

U.S. PATENT DOCUMENTS

| 5,213,461 | A  | * | 5/1993 | Kalisher  | 412/4 |
| 2003/0053816 | A1 | * | 3/2003 | Asai | 399/82 |
| 2005/0094181 | A1 | * | 5/2005 | Koyano | 358/1.13 |
| 2008/0046829 | A1 | * | 2/2008 | Leong | 715/764 |

FOREIGN PATENT DOCUMENTS

JP  6-155846 A  6/1994

OTHER PUBLICATIONS

Yamamoto et al., "Printer"; JP Pub Date Jun. 1994; Machine translation in english for JP Pub No. 06-155846.*

* cited by examiner

*Primary Examiner* — Benny Q Tieu
*Assistant Examiner* — Haris Sabah
(74) *Attorney, Agent, or Firm* — Canon USA Inc. IP Division (57) ABSTRACT

An information processing apparatus configured to generate a print job to execute bookbinding printing is provided. The information processing apparatus includes an identifying unit configured to identify a position of a pre-printed sheet where a page to be arranged on a background image of the pre-printed sheet is printed at the time of execution of the bookbinding printing, a selecting unit configured to select the pre-printed sheet to be used in the bookbinding printing from a plurality of different pre-printed sheets set in the printer so that data indicating content of the page to be arranged on the background image of the pre-printed sheet is printed at the position identified by the identifying unit, and a generating unit configured to generate the print job so that the printer prints the data using the pre-printed sheet selected by the selecting unit.

5 Claims, 10 Drawing Sheets

INFORMATION PROCESSING APPARATUS, INFORMATION PROCESSING METHOD, AND STORAGE MEDIUM FOR STORING PROGRAM

BACKGROUND OF THE INVENTION

1. Field of the Invention

The present invention relates generally to information processing apparatuses, information processing methods, and programs. More particularly, the present invention relates to a technique used in printing of data using pre-printed sheets at specific pages during bookbinding.

2. Description of the Related Art

Forms or the like are sometimes printed using pre-printed sheets. Pre-printed sheets are often used at specific pages of a print job. There are known methods for specifying pages that a user wants to use pre-printed sheets. A printer may include a specific sheet feeding cassette in which the pre-printed sheets are set. Pre-printed sheets are often fed from a manual feed tray.

An improvement related to printers permits bookbinding printing to be readily performed. The number of users who wants to carry out bookbinding printing at the time of creation of forms, such as insurance forms, for example, is increasing.

To meet the increasing demand, Japanese Patent Laid-Open No. 6-155846 proposes a printing apparatus. The printing apparatus proposed detects whether print data matches a type of pre-printed sheet on which the print data is to be printed and controls a print start position of the pre-printed sheet for each type of pre-printed sheet. The printing apparatus sends a pre-printed sheet identifier with spooled print data. If the pre-printed sheet identifier matches data set in a print start position storage table, the printing apparatus determines the print start position on the basis of the print start position storage table.

However, when pre-printed sheets are used at specific pages, the printing apparatus proposed in Japanese Patent Laid-Open No. 6-155846 may encounter some complications. Accordingly, bookbinding printing is difficult.

When an A4-size document is set at the time of bookbinding printing, A3-size sheets are generally used in order not to change the size of each page. In this case, A4-size pre-printed sheets are not used.

Figure 3A:
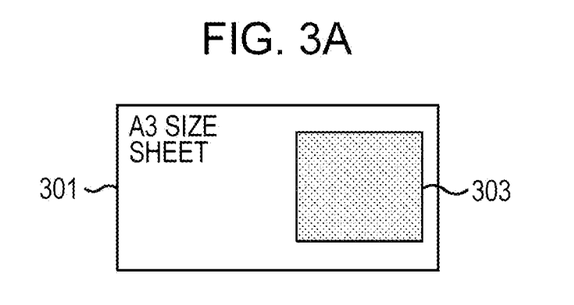
FIGS. 3A and 3B are diagrams illustrating an example of a pre-printed sheet and a lateral view of an example of a bound printed material, respectively.
Figure 3B:
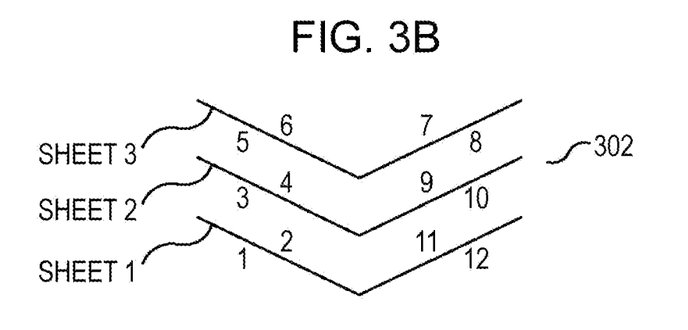

FIG. 3A shows an example of an A3-size pre-printed sheet 301. The pre-printed sheet 301 has an A4-size area 303 including a previously printed background image on the right side. In such a case, it is difficult to realize bookbinding printing shown in FIG. 3B using the pre-printed sheet 301 shown in FIG. 3A.

It is difficult for users to determine a position (front-right side, front-left side, back-right side or back-left side) of the pre-printed sheet on which each page is printed in bookbinding printing if the number of pages of a job varies. A lateral view of a bound printed material 302 shown in FIG. 3B will now be described. For example, page 9 is printed on the right side of the front side of a second sheet.

As described above, since an actual position of a sheet where each page is printed is determined in a complex manner, it is difficult for users to determine the position. There are different types of pre-printed sheets that may be used for each job. Therefore, the users have to select the appropriate pre-printed sheet for every print job, which may require a lot of time.

The printing apparatus proposed in Japanese Patent Laid-Open No. 6-155846 can adjust a print position of a pre-printed sheet. However, the printing apparatus has difficulty related to bookbinding printing.

SUMMARY OF THE INVENTION

The present invention allows a pre-printed sheet to be readily selected from a plurality of different pre-printed sheets.

According to an aspect of the present invention, an information processing apparatus for generating a print job for causing a printer to execute bookbinding printing using a pre-printed sheet in order to print a specific page of the print job includes an identifying unit configured to identify a position where a page to be arranged on a background image of the pre-printed sheet is printed at the time of execution of the bookbinding printing, a selecting unit configured to select the pre-printed sheet to be used in the bookbinding printing from a plurality of different pre-printed sheets set in the printer so that data indicating content of the page to be arranged on the background image of the pre-printed sheet is printed at the position identified by the identifying unit, and a generating unit configured to generate the print job so that the printer prints the data using the pre-printed sheet selected by the selecting unit.

Further features of the present invention will become apparent from the following description of exemplary embodiments with reference to the attached drawings.

DESCRIPTION OF THE EMBODIMENTS

System Configuration Diagram

Figure 1A:
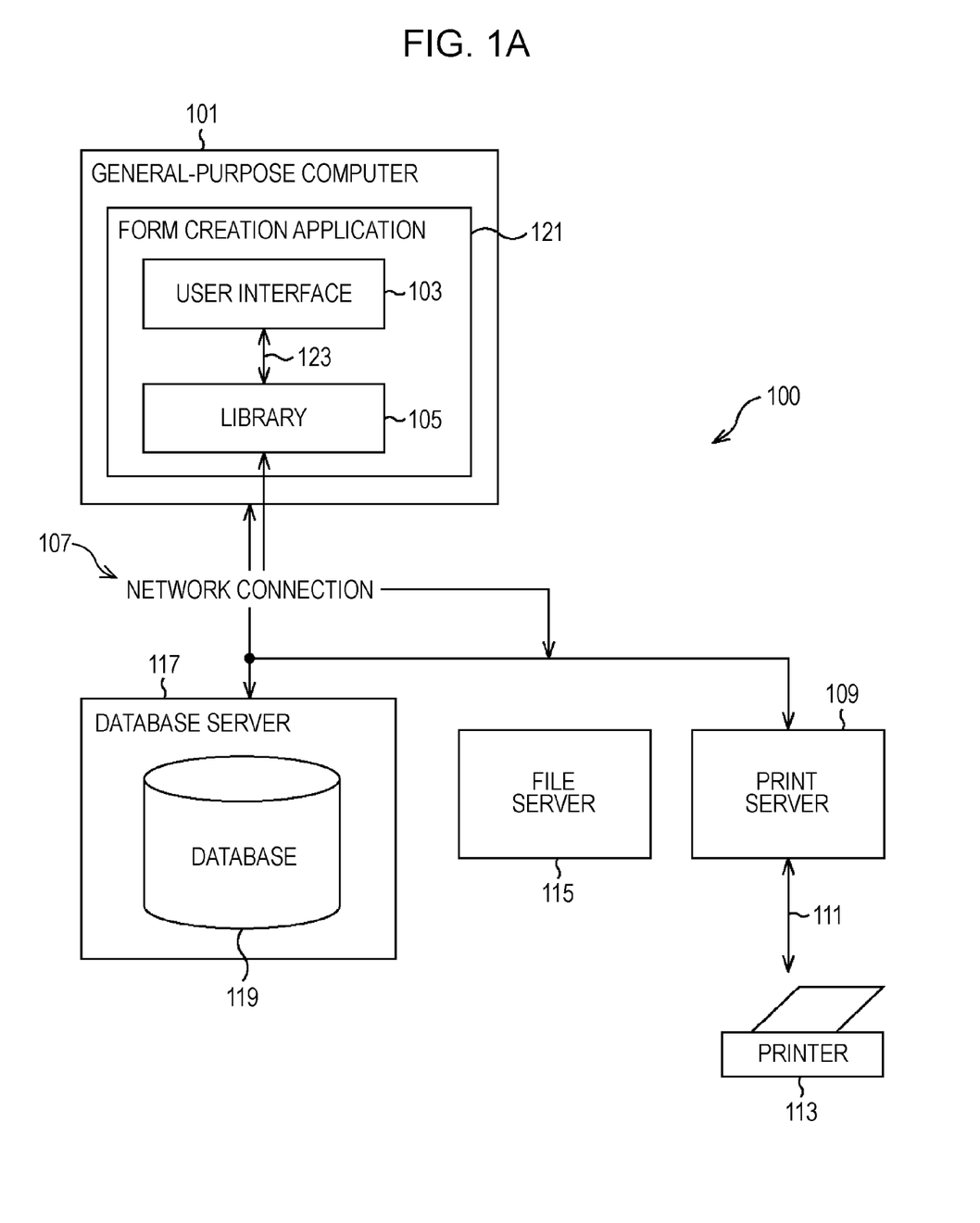
FIG. 1A is a block diagram illustrating an example of a configuration of a printing system for printing data, such as a form, on a pre-printed sheet.
Figure 1B:
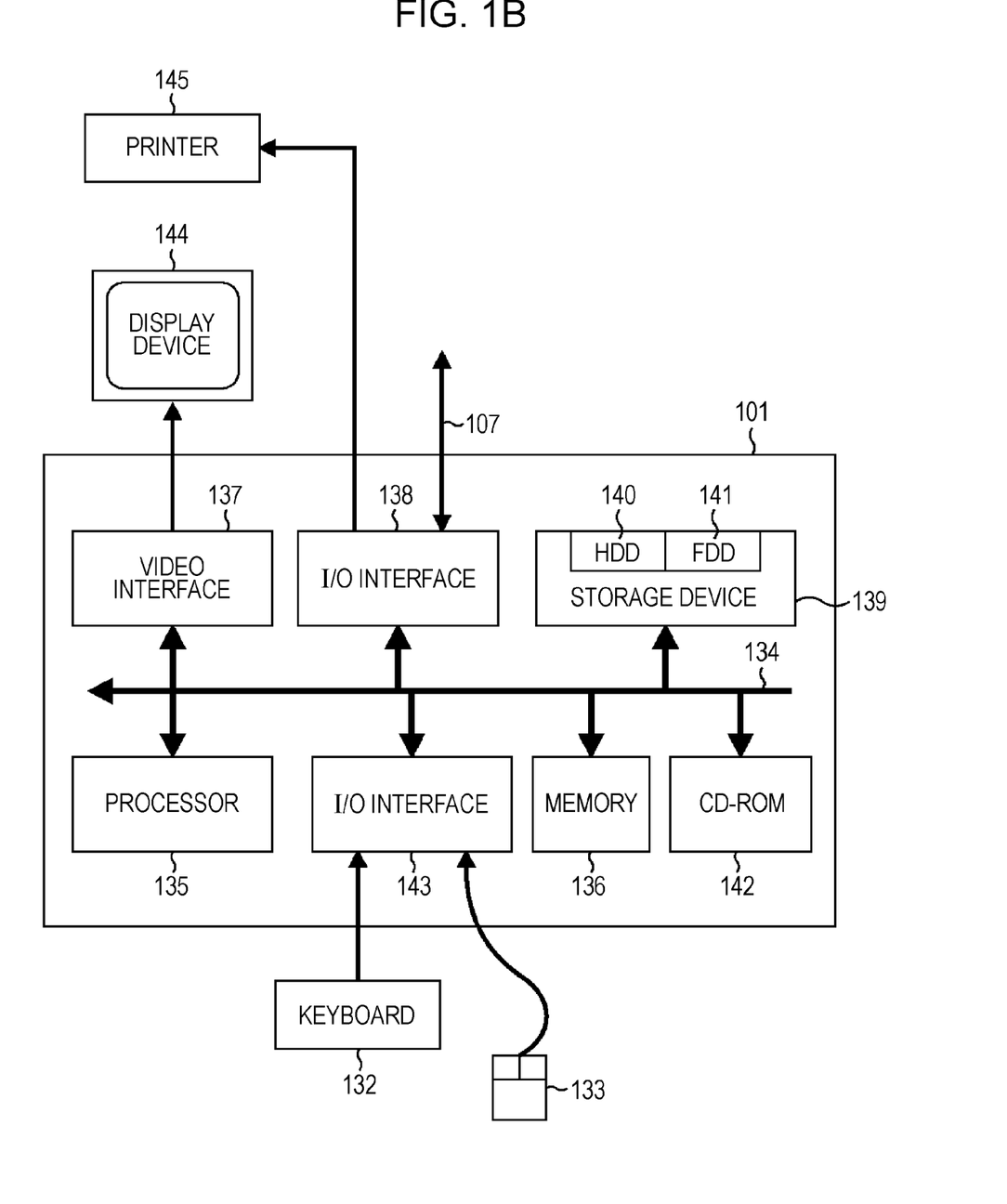
FIG. 1B is a block diagram illustrating an example of a configuration of a general-purpose computer module.

FIG. 1A is a block diagram illustrating an example of a printing system 100 capable of printing data, such as a form. A method to be described herein is executed by a general-purpose computer module 101, which will be described in detail with reference to FIG. 1B. A form creation application 121 can be executed by the printing system 100, processes described in FIG. 1B are executed by entire or part of software in the computer module 101.

Printing steps, such as edition of a layout and edition of a configuration file, are executed in accordance with instructions of software executed by the computer module 101. The software is stored on a computer-readable medium, which may be, for example, a storage device to be described below.

The software is loaded into the computer module 101 from the computer-readable medium and executed by the computer module 101. Such software and a computer-readable medium storing the computer program are computer program products. The computer module 101 executes the computer program products, thereby being able to realize functions advantageously used for edition of a layout of a document and printing of data.

The computer module 101 is connected to an input device, such as a keyboard 132 and a pointing device such as a mouse 133. The computer module 101 is also connected to an output device, such as a display device 144 and a local printer 145. The computer module 101 includes a printer driver. The printer driver generates a print job that can be interpreted by a printer.

An input/output (I/O) interface 138 can connect the computer module 101 to other computers of the printing system 100 via a network connection line 107. The network connection line 107 is typically a local area network (LAN) or a wide area network (WAN).

The computer module 101 typically includes at least one processor 135 and a memory 136, which may be a semiconductor random access memory (RAM) and a read-only memory (ROM), for example. The computer module 101 also includes an I/O interface, such as a video interface 137, and an I/O interface 143 for connecting the keyboard 132 and the mouse 133.

A storage device 139 typically includes a hard disk drive (HDD) 140 and a flexible disk drive (FDD) 141. Although not shown, a magnetic tape drive may also be used as the storage device 139. A compact disc-read only memory (CD-ROM) drive 142 is provided as a nonvolatile data source.

The computer module 101 has an operating system, such as GNU/LINUX or Microsoft Windows®. The computer module 101 performs communication through an interconnection bus 134 in accordance with the operating system or a method according to a typical operation mode of a computer system formed with techniques of the related art. To perform the communication, the computer module 101 utilizes the I/O interface 138 through the processor 135. In the example of the configuration of the computer module 101 shown in FIG. 1B, an IBM compatible personal computer (PC), a SUN SPARCstation, or a computer system including the IBM compatible PC and the SUN SPARCstation can be used.

The form creation application 121 typically resides in the HDD 140. The form creation application 121 is executed, read out, and controlled by the processor 135. Data fetched from a buffer storage device of the form creation application 121 and the network connection line 107 use the semiconductor memory 136 in response to the HDD 140.

Some instances encode the form creation application 121 in the CD-ROM drive 142 or the FDD 141. The form creation application 121 is loaded and provided to users through the respective drives 142 and 141. Alternatively, the form creation application 121 is loaded by users from the network connection line 107.

The software may be loaded to the computer module 101 from a magnetic tape, a ROM, an integrated circuit, a magneto-optical disk, a computer-readable card such as a PCMCIA card, and other computer-readable media having an appropriate capacity. The software may be loaded to the computer module 101 via wireless communication, infrared data communication between the computer module 101 and another device, communication through emails, and the Internet or intranet having recording information on a web site. The above-described media are only examples of the computer-readable media. Other kinds of computer-readable media may be used.

The form creation application 121 instructs creation and printing of a form. The form creation application 121 includes two software components. One is a library 105, which performs processing, such as overlay printing processing.

The other is a user interface 103, which provides a mechanism for allowing users to create a form and a configuration file. The user interface 103 and the library 105 communicate with each other through a communication channel 123. A typical database 119 included in a database server 117, which is constituted by another computer operating a database application, is generally used as a document creation database.

The computer module 101 communicates with the database server 117 via the network connection line 107. The form creation application 121 creates a form or a configuration file stored in the computer module 101 or a file server 115 generally constituted by another computer.

These documents are stored in a local file system of the computer module 101 or the file server 115, or are directly printed by a printer 113. A print server 109 is a computer for providing a network function to a printer that is not directly connected to a network. The print server 109 and the printer 113 are connected to each other through a typical communication channel 111.

Figure 2:
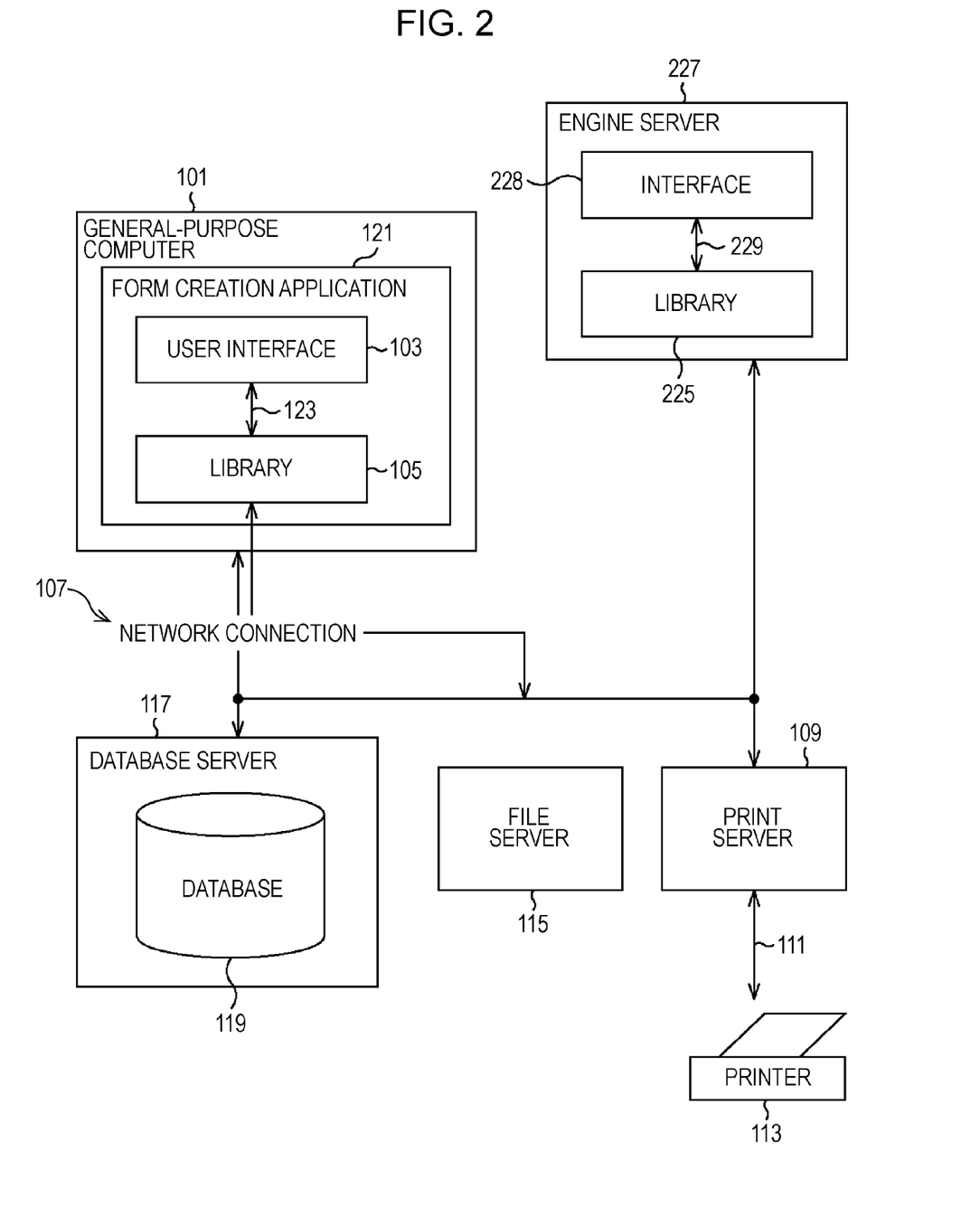
FIG. 2 is a block diagram illustrating an example of a configuration of a printing system including an independent library.

FIG. 2 is a diagram showing configurations similar to those shown in FIGS. 1A and 1B except for an engine server 227 and a library 225, which is an independent version of the library 105.

Referring to FIG. 2, the engine server 227 is a typical computer. For the purpose of printing and so forth, overlay printing is performed on a form stored in the file server 115 and data stored in the database 119 by the library 225 to create a document. Such an operation can be executed in response to a request entered through the user interface 103 or a user instruction entered to the library 225 through an interface 228.

A method for automatically determining a type of pre-printed sheet and feeding the determined type of pre-printed sheet in response to a bookbinding instruction according to a first exemplary embodiment will be described with reference to examples shown in FIGS. 5A and 5B.

Figure 5A:
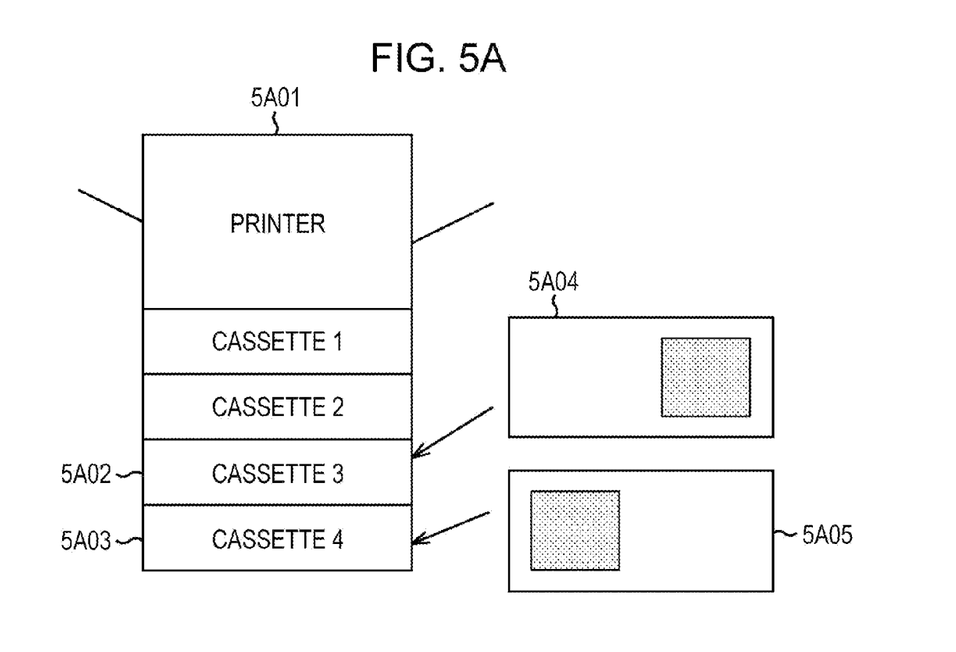
FIG. 5A is a diagram illustrating a state in which two kinds of pre-printed sheets are set in respective sheet feeding cassettes of a printer according to a first exemplary embodiment of the present invention.

Two types of pre-printed sheets 5A04 and 5A05 shown in FIG. 5A are prepared. Data is pre-printed in an A4-size part on the right side of the A3-size first pre-printed sheet 5A04. Similarly, data is pre-printed on the left side of the second pre-printed sheet 5A05.

The first and second pre-printed sheets 5A04 and 5A05 are set in sheet feeding cassettes 3 (5A02) and 4 (5A03) of a printer 5A01, respectively. Setting of the first and second pre-printed sheets 5A04 and 5A05 is then registered in the printer 5A01. The registration is performed using, a "sheet label." More specifically, a sheet feeding cassette can be registered in the printer 5A01 in association with a kind of a pre-printed sheet as the sheet label. For example, settings, such as "cassette 3: pre-printed sheet for bookbinding (the right side of the front side)" and "cassette 4: pre-printed sheet for bookbinding (the left side of the front side)," are made.

The engine server 227 receives a job instructing "printing of a total of 12 pages," "bookbinding printing," and "use of a pre-printed sheet on page 9."

The library 225 then generates a print image in consideration of the page order of bookbinding. The library 225 determines that "page 9 is a pre-printed sheet with the right side of the front side of a second sheet." The library 225 then specifies the sheet label "pre-printed sheet for bookbinding (the right side of the front side)" as the second sheet.

The printer 5A01 then receives the print job, feeds sheets from respective sheet feeding cassettes, and prints data of each page. The printer 5A01 feeds the second sheet from the sheet feeding cassette 3 in accordance with the sheet label of "pre-printed sheet for bookbinding (the right side of the front side)" specified by the library 225. According to the above-described method, an appropriate type of pre-printed sheet is automatically selected from a plurality of different pre-printed sheets.

Figure 6:
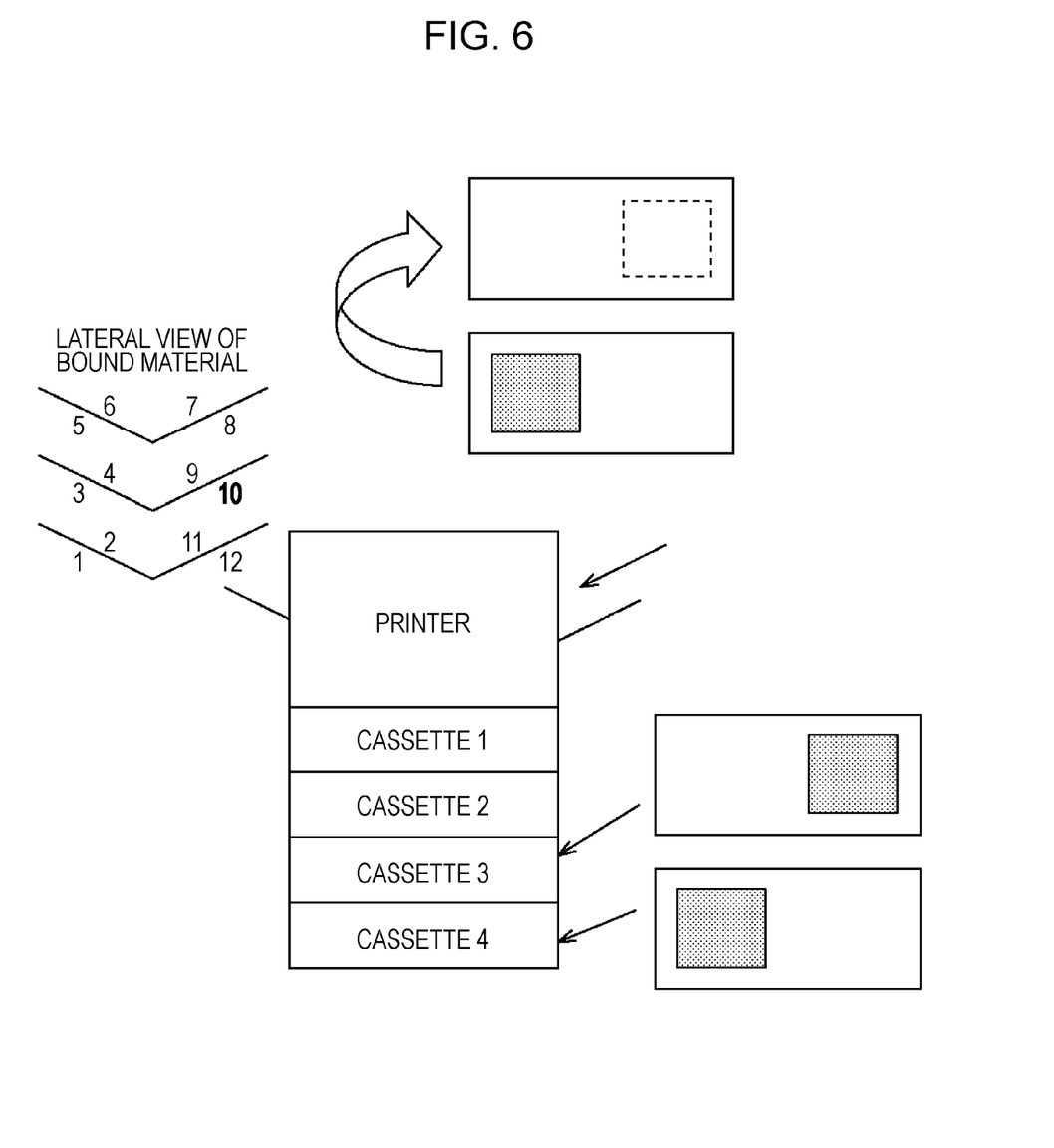
FIG. 6 is a diagram illustrating a state of printing data after turning a pre-printed sheet over according to a first exemplary embodiment of the present invention.

A case where a page is printed on a back side of a pre-printed sheet will now be considered. FIG. 6 shows an example where a pre-printed sheet is used on page 10. The printer 5A01 feeds a pre-printed sheet from the sheet feeding cassette 4, turns the pre-printed sheet with a duplex printing unit, and prints the data, thereby printing the data on the back side. A print job including instruction information indicating that a pre-printed sheet is fed through the duplex printing unit is generated.

Figure 8:
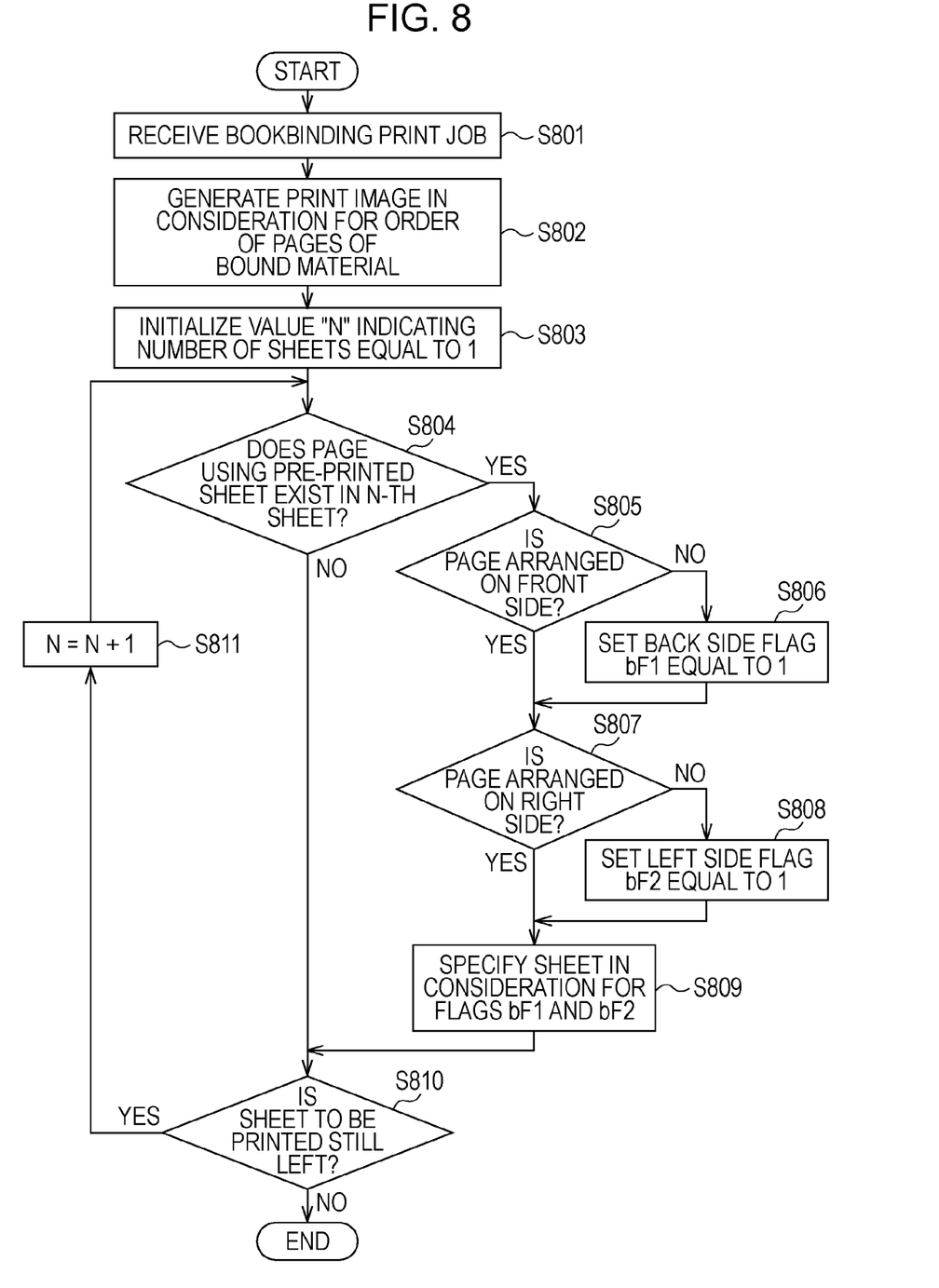
FIG. 8 is a flowchart illustrating an example of a printing operation according to a first exemplary embodiment of the present invention.

A printing operation according to this exemplary embodiment will now be described with reference to a flowchart shown in FIG. 8. FIG. 8 is a flowchart illustrating processing performed by the library 225. The flowchart describes the above-described processing in which "the library 225 generates a print image in consideration of the page order for bookbinding." The processor 135 of the computer module 101 executes a control program stored in the HDD 140, thereby executing each step of the flowchart shown herein.

At STEP S801, the engine server 227 receives a print job specified by a user.

At STEP S802, the library 225 calculates the page order of bookbinding and generates a print image for each side of a sheet.

At STEP S803, the library 225 initializes a value of an internal parameter N, which controls the number of sheets, equal to 1.

At STEP S804, the library 225 determines the page number on which a pre-printed sheet is used. In the above-described example, a positive determination result is obtained when the parameter N=2.

If it is determined to be positive as a result of the determination at STEP S804, the library 225 performs processing at STEPs S805-S809. The library 225 determines whether a page to be arranged on a background image of a pre-printed sheet is printed on the front side or the back side of the pre-printed sheet and determines whether the page is printed on the right or left side of the pre-printed sheet. More specifically, at STEP S805, the library 225 determines whether the page to be arranged on the background image of the pre-printed sheet is printed on the front side of the pre-printed sheet. If the determination result is negative, the process proceeds to STEP S806. At STEP S806, the library 225 sets a back side flag as "bF1=1." The process then proceeds to STEP S807. If the determination result of STEP S805 is positive, the process proceeds directly to STEP S807.

At STEP S807, the library 225 determines whether the page to be arranged on the background image of the pre-printed sheet is printed on the right side of the pre-printed sheet. If the determination result is negative, the process proceeds to STEP S808. At STEP S808, the library 225 sets a left side flag as "bF2=1." The process then proceeds to STEP S809. If the determination result of STEP S807 is positive, the process proceeds directly to STEP S809. At STEP S809, the library 225 stores the above-described determination results internally.

Figure 5B:
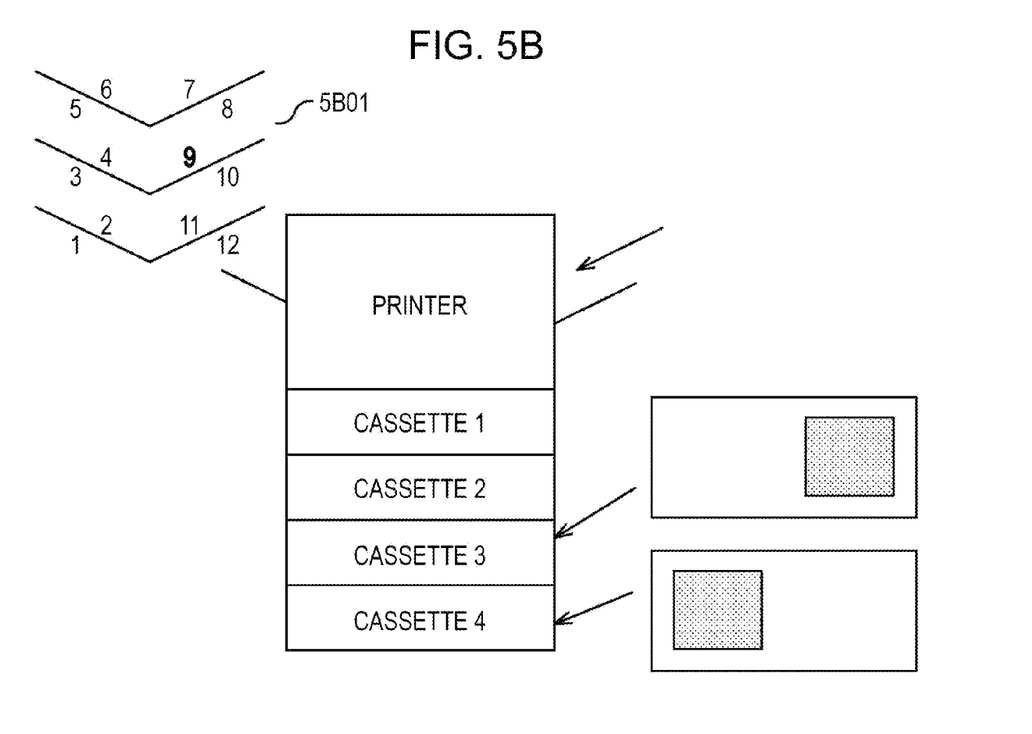
FIG. 5B is a diagram illustrating a method for automatically determining the type of pre-printed sheet used in bookbinding printing and feeding the determined type of pre-printed sheet according to a first exemplary embodiment of the present invention.

At STEP S809, the library 225 specifies a sheet label in consideration for the set flags "bF1" and "bF2." When the page to be arranged on the background image of the pre-printed sheet is printed on the right side of the front side of the pre-printed sheet as shown in FIG. 5B, the library 225 specifies a sheet label corresponding to the cassette 3. Similarly, when the page to be arranged on the background image of the pre-printed sheet is printed on the left side of the front side of the pre-printed sheet, the library 225 specifies a sheet label corresponding to the cassette 4.

When the page to be arranged on the background image of the pre-printed sheet is printed on the right side of the back side of the pre-printed sheet, the library 225 specifies a sheet label corresponding to the cassette 4. Similarly, when the page to be arranged on the background image of the pre-printed sheet is printed on the left side of the back side of the pre-printed sheet, the library 225 specifies a sheet label corresponding to the cassette 3.

At STEP S810, the library 225 determines whether a sheet to be printed is still left. If the determination result is positive, the library 225 increments the value of the parameter N by 1, "N=N+1," at STEP S811. The process then returns to STEP S804. At STEP S804, the above-described processing is performed. The maximum value of the parameter N is equal to 3. By executing the above-described method, an appropriate type of pre-printed sheet can be automatically selected from a plurality of different pre-printed sheets.

As a result, a print job for causing a printer to print data using a selected pre-printed sheet is generated so that the data indicating content of a page to be arranged on a background image of a pre-printed sheet is printed on the background image.

In the first exemplary embodiment, a case where one pre-printed sheet is used in a print job has been described. In a second exemplary embodiment, a case where a plurality of pre-printed sheets are used in a print job will be described.

Figure 4:
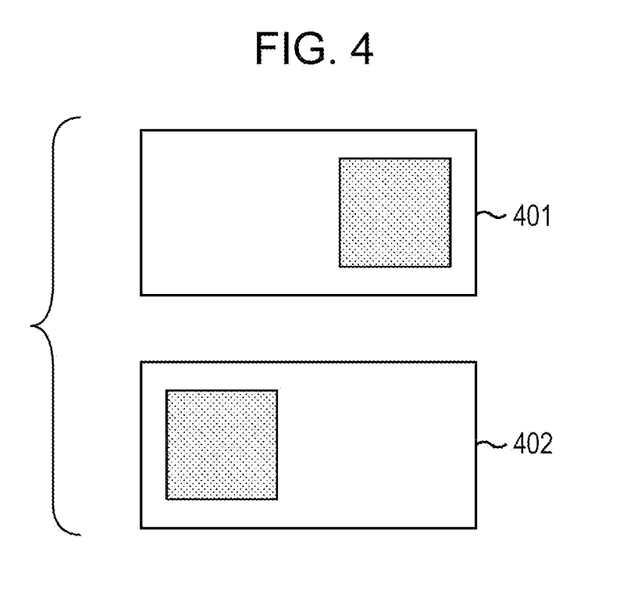
FIG. 4 is a diagram illustrating two kinds of pre-printed sheets according to a first exemplary embodiment of the present invention.
Figure 9:
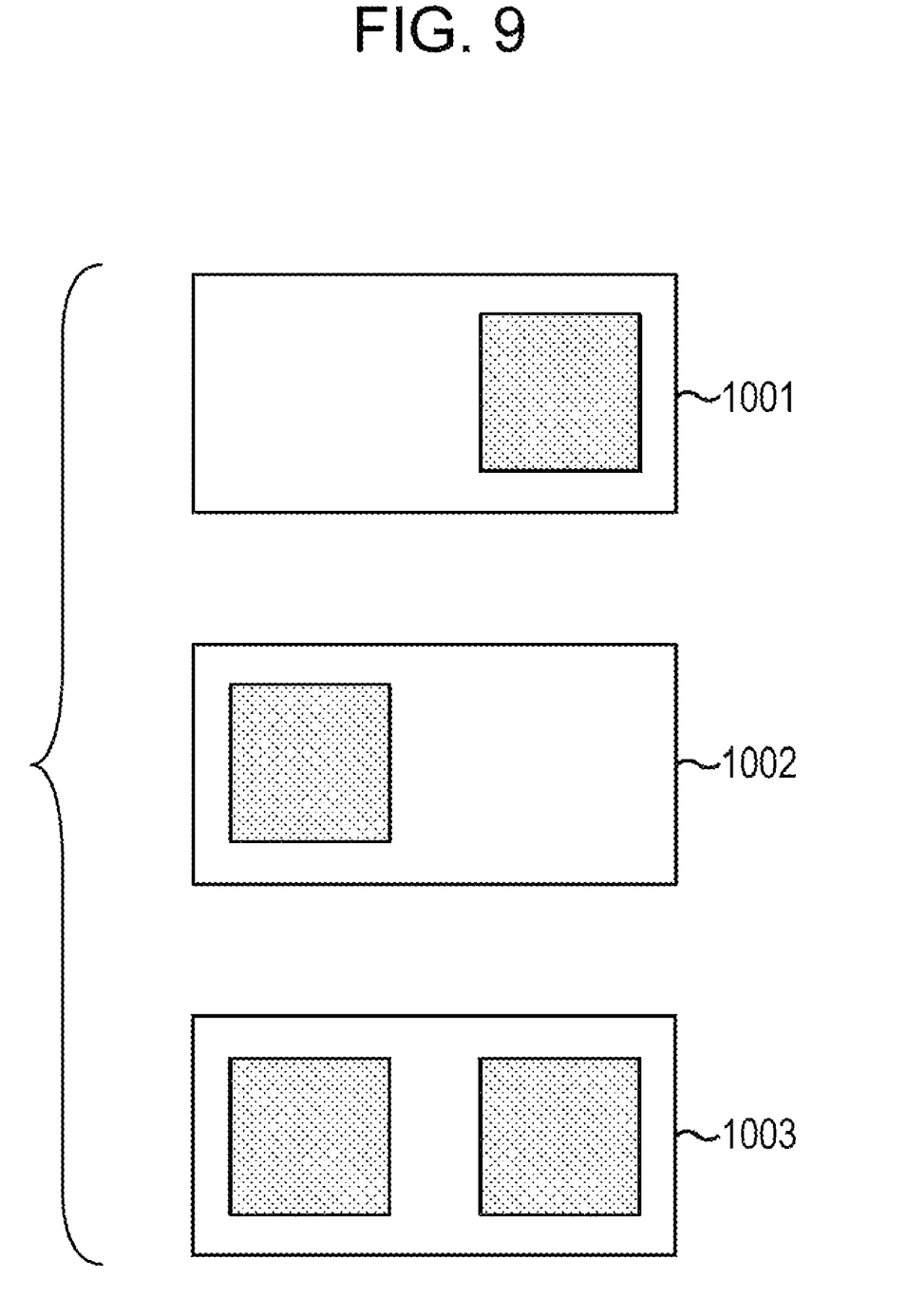
FIG. 9 is a diagram illustrating an example in which pre-printed sheets are used in consideration for a combination of a plurality of pages according to a second exemplary embodiment of the present invention.

When a plurality of pre-printed sheets are used in a print job, pre-printed sheets are used in consideration for a combination of a plurality of pages as shown in FIG. 9. However, it is difficult to prepare various types of pre-printed sheets for complicated combinations, a method using two different types of pre-printed sheets (401 and 402) shown in FIG. 4 will be described here.

The second exemplary embodiment will now be described with reference to FIGS. 7A and 7B.

Figure 7A:
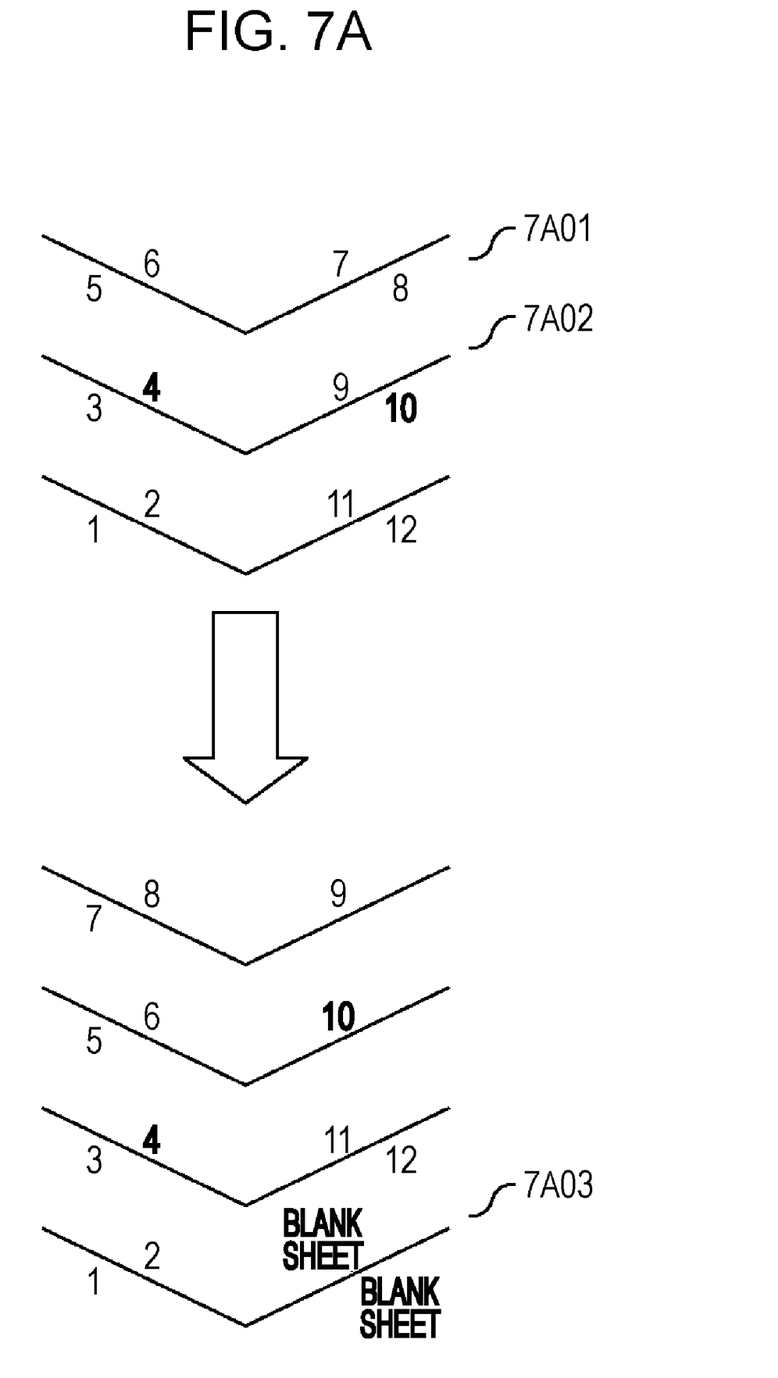
FIG. 7A is a diagram illustrating a first example where pre-printed sheets are used at a plurality of pages of a print job according to a second exemplary embodiment of the present invention.

Referring to FIG. 7A, pages to be arranged on background images of pre-printed sheets exist on pages 4 and 10. The pages 4 and 10 are arranged on a second sheet 7A02 at the time of bookbinding. Blank pages (7A03) are inserted so that the pages 4 and 10 are printed on different sheets in the print job. In this manner, intended bookbinding is realized only using the two types of pre-printed sheets (401 and 402) shown in FIG. 4.

However, the number of sheets increases in this case. Although only three sheets are originally used in the example shown in FIG. 7A, the number of sheets increases to 4 due to insertion of the blank pages.

Figure 7B:
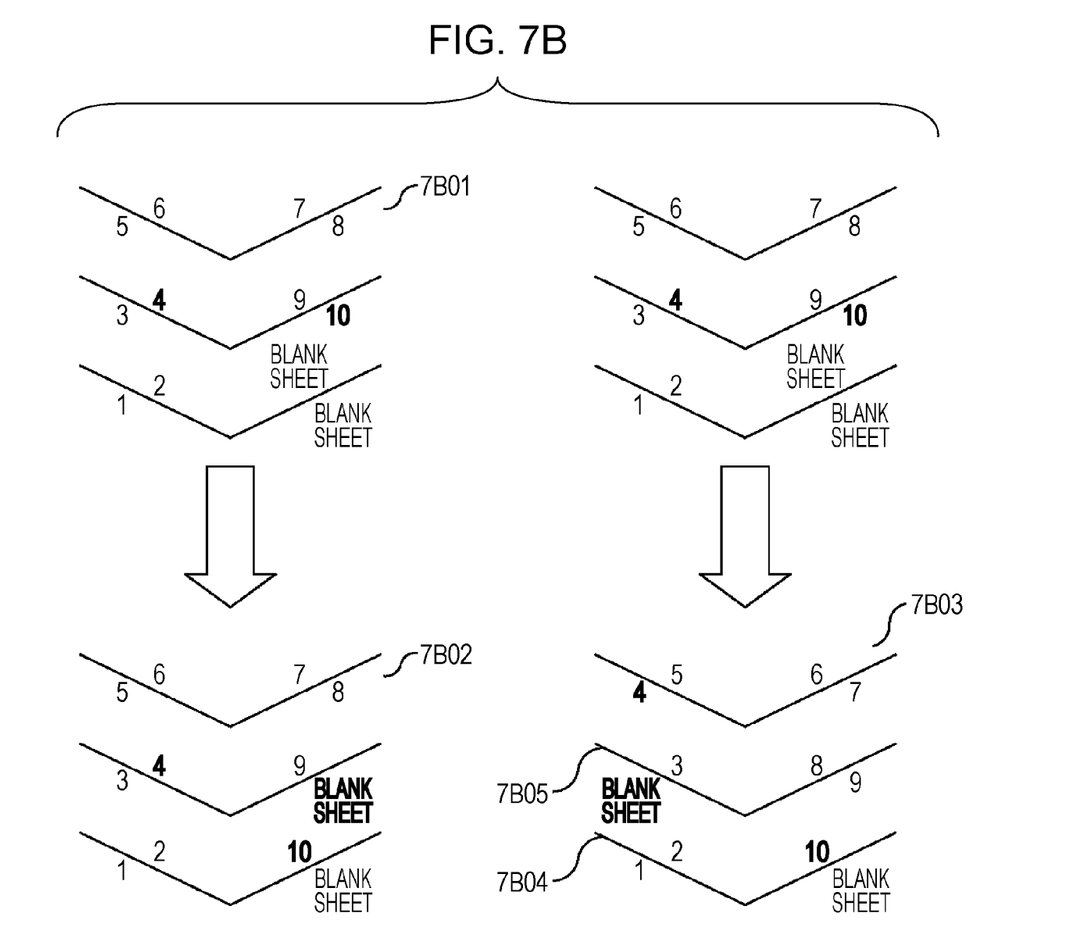
FIG. 7B is a diagram illustrating a second example where pre-printed sheets are used at a plurality of pages of a print job according to a second exemplary embodiment of the present invention.

FIG. 7B describes an example for avoiding the increase in the number of sheets.

FIG. 7B shows an example where a total number of pages of a print job is 10 pages and pages using pre-printed sheets are located on pages 4 and 10 as in the case of FIG. 7A.

If the total number of pages of the print job is not a multiple of 4, blank pages are inserted in bookbinding printing so that the total number of pages becomes equal to a multiple of 4. Since the total number of pages of a bounded material 7B01 shown in FIG. 7B is equal to 10 pages, two blank pages are added at the end. In this exemplary embodiment, a blank page is inserted between pages 9 and 10 (7B02) instead of the blank page inserted at the end so that the pages 4 and 10 are printed on different sheets. In this manner, intended bookbinding printing using pre-printed sheets can be performed without increasing the number of sheets.

Furthermore, the insertion positions of blank sheets do not matter in this method as long as pages using pre-printed sheets are printed on different sheets. Blank sheets may be automatically inserted at a predetermined time of a print job by utilizing this characteristic.

For example, a timing of a front cover or a back cover of a book can be used. In the bookbinding result 7B03 shown in FIG. 7B, a blank page is inserted between page 2 arranged on a sheet 7B04 used as a cover of the book and page 3 arranged on a second sheet 7B05. In another example, when content of a print job is constituted by chapters, such as a chapter 1 and a chapter 2, a blank page may be inserted at a change of the chapters. By inserting a blank page between pages as in this exemplary embodiment, a printed material intended by users can be obtained even if many kinds of pre-printed sheets are not prepared. Although insertion of blank pages has been described in this exemplary embodiment, the inserted blank pages may be output as commands to be printed as blank sheets. For example, the blank pages may be realized by page feed commands.

A printer according to a third exemplary embodiment has a function for storing content of pre-printed sheets on a storage medium included therein. By having such a storage function, the printer can use pre-printed sheets at the time of bookbinding. This method can be used where unique barcode IDs are assigned to sheets or the number of imposition is too large to prepare pre-printed sheets. The method can also be used where only content of pre-printed sheets is needed.

Pre-printed sheets (print sheets) used at the time of bookbinding printing are previously set in a feeder for copying of a printer. When the printer prints data of a page using a pre-printed sheet in bookbinding printing, the printer captures the set print sheet and stores the content. The printer then prints content indicated by the print job, thereby being able to perform bookbinding printing reflecting the content of the print sheet.

Other Exemplary Embodiments of Present Invention

Each unit constituting the information processing apparatus according to the above-described exemplary embodiments of the present invention can be realized by a program stored in a RAM or a ROM of a computer. The program and a computer-readable recording medium storing the program are included in the present invention. An image forming apparatus may store such a program and execute processing according to the exemplary embodiments of the present invention.

The present invention may be embodied as a system, an apparatus, a method, a program, or a recording medium. More specifically, the present invention may be applied to a system including a plurality of devices or an apparatus including one device.

A software program for executing each step of the above-described information processing method according to the exemplary embodiments of the present invention (a program corresponding to the flowchart shown in FIG. 8 according to the exemplary embodiment) is supplied to the system or the apparatus directly or from a remote place. A computer included in the system or the apparatus reads out and executes the supplied program code. The present invention includes a case where the functions of the exemplary embodiments of the present invention are achieved in such a manner.

Accordingly, the program codes to be installed in the computer to realize the functions of the exemplary embodiments of the present invention in the computer are also included in the present invention. The present invention includes a computer program for realizing the functions of the exemplary embodiments of the present invention.

The computer program may be in any form, such as an object code, a program executed by an interpreter, or script data supplied to an OS, as long as the program has the functions of the program.

Types of a computer-readable recording medium for use in supplying the computer program include, for example, a flexible disk, a hard disk, an optical disc such as a CD-ROM, a CD-R, a CD-RW, or a DVD (DVD-ROM, DVD-R), a magneto-optical disk such as an MO, a magnetic tape, a nonvolatile memory card, and a ROM.

The program supplying method includes a case where a user accesses an Internet web site using a browser of a client computer and downloads the computer program according to an exemplary embodiment of the present invention or a compressed file having an automatic installation function to a recording medium, such as a hard disk, from the web site.

Additionally, program codes constituting the program according to the exemplary embodiment of the present invention may be divided into a plurality of files and each of the plurality of files may be downloaded from different web sites, whereby the present invention can be realized. The present invention also includes a WWW server that allows a plurality of users to download program files for realizing the functions of the exemplary embodiments of the present invention in a computer.

The program according to the exemplary embodiment of the present invention may be encrypted and recorded on a recording medium, such as a CD-ROM, and the recording medium may be distributed to users. Users satisfying a predetermined condition may be permitted to download key information for decrypting the encryption from a web site via the Internet, execute the encrypted program using the key information, and install the program in a computer.

In addition to realization of the functions according to the above-described exemplary embodiments by the computer's execution of the read out program codes, an operating system running on the computer may execute part of or all of actual processing, whereby the functions of the exemplary embodiments may be realized.

Furthermore, the program read out from a recording medium may be written in a memory of a function expansion board inserted into the computer or a function expansion unit connected to the computer. A CPU or the like included in the function expansion board or the function expansion unit may execute part of or all of actual processing on the basis of instructions of the program, thereby realizing the functions of the above-described exemplary embodiments.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-103839 filed on Apr. 11, 2008, which is hereby incorporated by reference herein in its entirety.

What is claimed is:

1. An information processing apparatus which generates a print job to a printer comprising:
   a processor including an identifying unit configured to identify anyone of a first position on a front side of a sheet, a second position on the front side of the sheet, a first position on a back side of the sheet and a second position on the back side of the sheet as a position where a page to be arranged on a background image of the pre-printed sheet is printed at the time of execution of the bookbinding printing to generate a book by folding a plurality of sheets before the print job is transmitted to the printer; and
   a generating unit configured to generate the print job based on the position identified by the identifying unit after the identifying unit identifies the position where a page to be arranged on the background image of the pre-printed sheet is to be printed so that the printer selects the pre-printed sheets having the background image printed on the position identified by the identifying unit and performs printing,
   a registering unit configured to register information about the pre-printed sheet previously prepared for execution of the bookbinding printing in the printer; and
   an inserting unit configured to insert a blank sheet between specific pages of the print job when printing of the data indicating the content of the page on the background image of the pre-printed sheet registered by the registering unit is not available.

2. The apparatus according to claim 1, further comprising:
   a requesting unit configured to request, when the pre-printed sheet is needed at the time of execution of the bookbinding printing, the pre-printed sheet;
   a storage unit configured to capture the pre-printed sheet in response to the request of the requesting unit and store content of the captured pre-printed sheet in a storage medium included in the printer; and
   a bookbinding printing unit configured to print the content stored in the storage medium included in the printer on the pre-printed sheet before printing the data to execute the bookbinding printing.

3. An information processing method to be executed by an information processing apparatus which generates a print job to a printer, the information processing method comprising:
   identifying anyone of a first position on a front side of a sheet, a second position on the front side of the sheet, a first position on a back side of the sheet and a second position on the back side of the sheet as a position where a page to be arranged on a background image of the pre-printed sheet is printed at the time of execution of the bookbinding printing to generate a book by folding a plurality of sheets before the print job is transmitted to the printer; and
   generating the print job based on the position identified after identifying the position where a page to be arranged on the background image of the pre-printed sheet is to be printed so that the printer selects the pre-printed sheets having the background image printed on the position identified by the identifying unit and performs printing,
   registering information about the pre-printed sheet previously prepared for execution of the bookbinding printing in the printer; and
   inserting a blank sheet between specific pages of the print job when printing of the data indicating the content of the page on the background image of the pre-printed sheet is not available.

4. The method according to claim 3, further comprising:
   requesting, when the pre-printed sheet is needed at the time of execution of the bookbinding printing, the pre-printed sheet;
   capturing the pre-printed sheet in response to the request and storing content of the captured pre-printed sheet in a storage medium included in the printer; and
   printing the content stored in the storage medium included in the printer on the pre-printed sheet before printing the data to execute the bookbinding printing.

5. A non-transitory computer-readable storage medium storing a computer-executable instructions for allowing a computer to execute an information processing method the non-transitory computer-readable storage medium comprising:
   computer-executable instructions for identifying anyone of a first position on a front side of a sheet, a second position on the front side of the sheet, a first position on a back side of the sheet and a second position on the back side of the sheet as a position where a page to be arranged on a background image of the pre-printed sheet is printed at the time of execution of the bookbinding printing to generate a book by folding a plurality of sheets before the print job is transmitted to the printer; and
   computer-executable instructions for generating the print job based on the position identified after identifying the position where a page to be arranged on the background image of the pre-printed sheet is to be printed so that the printer selects the pre-printed sheets having the background image printed on the position identified by the identifying unit and performs printing,
   registering information about the pre-printed sheet previously prepared for execution of the bookbinding printing in the printer; and
   inserting a blank sheet between specific pages of the print job when printing of the data indicating the content of the page on the background image of the pre-printed sheet is not available.

* * * * *